(12) United States Patent  (10) Patent No.: US 8,664,323 B2
Iyer et al.  (45) Date of Patent: Mar. 4, 2014

(54) FLUORINATED COMPOSITION, METHOD OF COATING THE COMPOSITION, AND ARTICLE THEREBY

(75) Inventors: Suresh S. Iyer, Woodbury, MN (US); Richard M. Flynn, Mahtomedi, MN (US); Moses M. David, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 95 days.

(21) Appl. No.: 13/111,504

(22) Filed: May 19, 2011

(65) Prior Publication Data

US 2011/0319546 A1 Dec. 29, 2011

Related U.S. Application Data

(60) Provisional application No. 61/358,505, filed on Jun. 25, 2010.

(51) Int. Cl.
*C09D 181/02* (2006.01)

(52) U.S. Cl.
USPC .................. 524/500; 427/407.1; 427/255.14

(58) Field of Classification Search
USPC .......................... 524/500; 427/407.1, 255.14
See application file for complete search history.

(56) References Cited

U.S. PATENT DOCUMENTS

| | | | |
|---|---|---|---|
| 3,350,808 | A | 11/1967 | Mitchell |
| 4,556,471 | A | 12/1985 | Bergman et al. |
| 6,696,157 | B1 | 2/2004 | David et al. |
| 6,878,419 | B2 | 4/2005 | David et al. |
| 7,294,731 | B1 | 11/2007 | Flynn et al. |
| 7,553,514 | B2 | 6/2009 | Fan et al. |
| 2005/0054804 | A1 * | 3/2005 | Dams et al. .............. 528/44 |

(Continued)

FOREIGN PATENT DOCUMENTS

| | | |
|---|---|---|
| WO | WO 2008/051789 A1 | 5/2008 |
| WO | WO-2008/051789 A1 * | 5/2008 |

(Continued)

OTHER PUBLICATIONS

U.S. Appl. No. 61/247,641, Moses et al., filed Oct. 1, 2009.

(Continued)

*Primary Examiner* — Peter D. Mulcahy
*Assistant Examiner* — Henry Hu
(74) *Attorney, Agent, or Firm* — Bradford B. Wright (57) ABSTRACT

A fluorinated composition includes: a polyfluoropolyether silane represented by the formula:

$$R_{fa}O(CF(CF_3)CF_2O)_p CF(CF_3)CH_2OZ^1Si(Y^1)_3; \text{ and}$$

a polyfluoropolyether silane represented by the formula:

$$R_{fb}[R^5CH_2OZ^2Si(Y^2)_3]_2$$

$R_{fa}$ represents a perfluoroalkyl group having from 1 to 12 carbon atoms, optionally substituted with at least one catenated oxygen atom or $-NR^8-$ group, wherein $R^8$ represents a perfluoroalkyl group; $Z^1$ represents $-R^1SR^2-$, $-R^1S(=O)R^2-$, or $-R^1S(=O)_2R^2-$, wherein $R^1$ and $R^2$ independently represent alkylene groups having from 1 to 12 carbon atoms; each $Y^1$ independently represents a hydrolyzable group; and p is a number in a range of from 3 to 50; $Z^2$ independently represents $-R^3SR^4-$, $-R^3S(=O)R^4-$, or $-R^3S(=O)_2R^4$, wherein $R^3$ and $R^4$ independently represent alkylene groups having from 1 to 12 carbon atoms; $Y^2$ independently represents a hydrolyzable group; $R_{fb}$ represents a perfluoroalkylene group having at least 3 carbon atoms, optionally substituted with at least one catenated oxygen atom or $-NR^6-$ group, wherein $R^6$ represents a perfluoroalkyl group; $R^5$ independently represents a covalent bond, or $-(OR^7)_b-$, and wherein $R^7$ independently represents a branched perfluoroalkylene group, and b independently represents a number greater than or equal to one.

8 Claims, 1 Drawing Sheet

(56) References Cited

U.S. PATENT DOCUMENTS

| | | |
|---|---|---|
| 2008/0050600 A1* | 2/2008 | Fan et al. .................. 428/447 |
| 2012/0097159 A1* | 4/2012 | Iyer et al. .............. 128/203.12 |
| 2012/0103330 A1* | 5/2012 | David et al. ............ 128/203.12 |
| 2012/0295119 A1* | 11/2012 | David ...................... 428/447 |

FOREIGN PATENT DOCUMENTS

| WO | WO 2010/129753 A1 | 11/2010 |
|---|---|---|
| WO | WO 2010/129758 A1 | 11/2010 |
| WO | WO 2011/041135 A2 | 4/2011 |

OTHER PUBLICATIONS

U.S. Appl. No. 61/755,887, Moses et al., filed May 6, 2009.

U.S. Appl. No. 61/175,898, Iyer et al., filed May 6, 2009.

Co-pending U.S. Pat. Appl. No. 12/574,182, Iyer et al., filed Oct. 6, 2009.

International Search Report, PCT/US2011/041646, mailed Aug. 1, 2011, 3 pages.

Written Opinion of the International Searching Authority, PCT/US2011/041646, mailed Aug. 1, 2011, 6 pages.

\* cited by examiner

FLUORINATED COMPOSITION, METHOD OF COATING THE COMPOSITION, AND ARTICLE THEREBY

CROSS-REFERENCE TO RELATED APPLICATION

This application claims priority to U.S. Provisional Patent Application No. 61/358,505, filed Jun. 25, 2010, the disclosure of which is incorporated by reference herein in its entirety.

TECHNICAL FIELD

The present disclosure relates to compositions comprising mixtures of polyfluorinated polyethers, methods of coating them, and articles produced thereby.

BACKGROUND

Some fluorinated compounds have been used in protective coatings for substrates. The protective coatings typically render substrates that have been contaminated by one or more environmental agents such as, for example, mineral deposits, oil and/or grease deposits (e.g., fingerprints), water damage, and ink marks more easily cleaned. Examples of substrates that have been treated with protective coatings include bathroom fixtures, kitchen fixtures, household appliances, mirrors, and automotive wheels and rims.

However, some fluorinated compounds that have been used, especially those including polyfluoropolyether groups and having amide linkages, are sensitive to hydrolysis and can degrade under hydrolytic conditions, thereby losing their effectiveness.

SUMMARY

In one aspect, the present disclosure provides a fluorinated composition comprising:
(a) from 51 to 95 parts by weight of a first polyfluoropolyether silane represented by the formula:

$$R_{fa}O(CF(CF_3)CF_2O)_pCF(CF_3)CH_2OZ^1Si(Y^1)_3$$

wherein:
  $Z^1$ represents —$R^1$—S—$R^2$—, —$R^1$—S(=O)—$R^2$—, or —$R^1$—S(=O)$_2$—$R^2$—, wherein $R^1$ and $R^2$ independently represent alkylene groups having from 1 to 12 carbon atoms;
  each $Y^1$ independently represents a hydrolyzable group; and
  $R_{fa}$ represents a perfluoroalkyl group having from 1 to 12 carbon atoms, optionally substituted with at least one catenated oxygen atom or —$NR^8$— group, wherein $R^8$ represents a perfluoroalkyl group;
  p is a number in a range of from 3 to 50; and
(b) from 5 to 49 parts by weight of a second polyfluoropolyether silane represented by formula:

$$R_{fb}[R^5CH_2OZ^2Si(Y^2)_3]_2$$

wherein:
  each $Z^2$ independently represents —$R^3$—S—$R^4$—, —$R^3$—S(=O)—$R^4$—, or —$R^3$S(=O)$_2$—$R^4$, wherein $R^3$ and $R^4$ independently represent alkylene groups having from 1 to 12 carbon atoms;
  each $Y^2$ independently represents a hydrolyzable group;
  each $R^5$ independently represents a covalent bond, or —$(OR^7)_b$—, wherein each $R^7$ independently represents a branched perfluoroalkylene group, and each b independently represents a number greater than or equal to one; and
  $R_{fb}$ represents a perfluoroalkylene group having at least 3 carbon atoms, optionally substituted with at least one catenated oxygen atom or —$NR^6$— group, wherein $R^6$ represents a perfluoroalkyl group.

In some embodiments, the second polyfluoropolyether silane is represented by the formula:

$$(Y^2)_3SiZ^2OCH_2CF_2R^9CF_2CH_2OZ^2Si(Y^2)_3$$

wherein $R^9$ is a divalent group consisting of from 1 to 50 —$OCF_2CF_2$— groups randomly interspersed with from 3 to 40 —$OCF_2$— groups.

In some embodiments, $Z^1$ is a divalent group represented by the formula:

—$R^1$—S—$R^2$— wherein each $R^1$ and $R^2$ independently represents an alkylene group having from 1 to 12 carbon atoms. In some embodiments, $Z^1$ is —$CH_2CH_2CH_2SCH_2CH_2CH_2$—.

In some embodiments, $Z^2$ is a divalent group represented by the formula:

—$R^3$—S—$R^4$— and wherein each of $R^3$ and $R^4$ independently represents an alkylene group having from 1 to 12 carbon atoms. In some embodiments, $Z^2$ is —$CH_2CH_2CH_2SCH_2CH_2CH_2$—.

In some embodiments, the fluorinated composition comprises from 60 to 95 parts by weight, or from 65 to 75 parts by weight, of the first polyfluoropolyether silane based on a combined weight of the first and second polyfluoropolyether silanes.

Fluorinated compositions according to the present disclosure are useful; for example, to provide a protective coating on a substrate. Accordingly, in another aspect, the present disclosure provides a method of coating a substrate, the method comprising applying a fluorinated composition according to the present disclosure to at least a portion of a surface of the substrate. In some embodiments, the surface of the substrate comprises a layer comprising silicon, oxygen, and hydrogen formed by plasma deposition. In some embodiments, the plasma deposition comprises ion-assisted plasma deposition. In some embodiments, the surface of the substrate comprises diamond-like glass. In some embodiments, the at least partially fluorinated composition is applied to the surface of the substrate by thermal evaporation and condensation. In some embodiments, the at least a portion of the surface of the substrate comprises metal, ceramic, and/or glass. In some embodiments, the substrate is selected from the group consisting of a kitchen fixture, a bathroom fixture, or a household appliance.

In yet another aspect, the present disclosure provides an article comprising a coated substrate prepared according to any method according to the present disclosure.

Advantageously, the protective coatings derived from fluorinated compositions according to the present disclosure exhibit good performance and hydrolytic resistance.

In the specification and claims, numerical ranges are inclusive of their endpoints unless otherwise specified.

In the specification and claims the term hydrolyzable group refers to a group that is readily cleaved or removed from the atom to which it is bonded by action of liquid water having a pH of from 1 to 10 and atmospheric pressure.

The foregoing embodiments may be implemented in any combination thereof, unless such combination is clearly erroneous in view of the teachings of the present disclosure. The features and advantages of the present disclosure will be further understood upon consideration of the detailed description as well as the appended claims.

As used herein, the phrase "substituted with a catenated atom or group" in reference to a perfluoroalkyl or perfluoroalkylene group refers to a chemical structure wherein an interior carbon atom (i.e., not terminal) of the perfluoroalkyl or perfluoroalkylene group, and its associated fluorine atoms, are replaced by the respective atom or group.

It should be understood that numerous other modifications and embodiments can be devised by those skilled in the art, which fall within the scope and spirit of the principles of the disclosure.

DETAILED DESCRIPTION

The first polyfluoropolyether silane includes one or more compounds represented by the formula:

$$R_{fa}O(CF(CF_3)CF_2O)_pCF(CF_3)CH_2OZ^1Si(Y^1)_3$$

$R_{fa}$ represents a perfluoroalkyl group having from 1 to 12 carbon atoms, optionally substituted with at least one catenated oxygen atom or —NR$^8$— group, wherein R$^8$ represents a perfluoroalkyl group (e.g., a perfluoroalkyl group having from 1 to 6 carbon atoms or from 1 to 4 carbon atoms). In some embodiments $R_{fa}$ has from 2 to 6 carbon atoms, from 2 to 4 atoms, or three carbon atoms. Exemplary $R_{fa}$ groups include perfluoromethyl, perfluoroethyl, perfluoropropyl, perfluorobutyl, perfluoropentyl, perfluorohexyl, $CF_3CF_2OCF_2CF_2CF_2$—, $CF_3OCF_2CF_2CF_2$—, $CF_3CF_2OCF_2CF_2CF_2$—, $CF_3CF_2CF_2(OCF_2CF_2)_x$— wherein x is in a range of from 1 to 4, $CF_3CF_2N(CF_3)CF_2CF_2CF_2$—, and $CF_3CF_2N(CF_2CF_2CF_2CF_3)CF_2CF_2CF_2$—.

Each Y$^1$ independently represents a hydrolyzable group. Examples include lower alkoxy having from 1 to 3 carbon atoms (e.g., methoxy, ethoxy, and propoxy), halide (e.g., chloride and bromide), and lower alkanoyloxy having from 2 to 4 carbon atoms (e.g., acetoxy and propanoyloxy).

Z$^1$ represents —R$^1$SR$^2$—, —R$^1$S(=O)R$^2$—, or —R$^1$S(=O)$_2$R$^2$—. R$^1$ and R$^2$ independently represent alkylene groups having from 1 to 12 carbon atoms. In some embodiments, R$^1$ and R$^2$ independently represent alkylene groups having from 1 to 8, 6, or 4 carbon atoms. Examples of R$^1$ and R$^2$ alkylene groups include: methylene; ethane-1,2-diyl (—CH$_2$CH$_2$—); propane-1,2-diyl; propane-1,3-diyl; butane-1,4-diyl; hexane-1-6-diyl; octane-1,8-diyl; isooctane-1,7-diyl; and dodecane-1,10-diyl. One particularly useful group Z$^1$ is —CH$_2$CH$_2$CH$_2$SCH$_2$CH$_2$CH$_2$—.

The value of p is in a range of from 3 to 50. Examples include values of p in a range of from 3 to 50, from 3 to 20, and from 3 to 10.

Examples of useful first polyfluoropolyether silanes include the following approximate average structures:
$CF_3CF_2CF_2O[CF(CF_3)CF_2O]_pCF(CF_3)$
  $CH_2OCH_2CH_2CH_2SCH_2CH_2CH_2Si(OCH_3)_3$;
$CF_3CF_2CF_2O[CF(CF_3)CF_2O]_pCF(CF_3)$
  $CH_2OCH_2CH_2CH_2SCH_2CH_2CH_2$—Si(OCH$_2$CH$_3$)$_3$;
$CF_3CF_2CF_2O[CF(CF_3)CF_2O]_pCF(CF_3)$
  $CH_2OCH_2CH_2SCH_2CH_2CH_2Si(OCH_3)_3$; and
$CF_3CF_2CF_2O[CF(CF_3)CF_2O]_pCF(CF_3)$
  $CH_2OCH_2CH_2SCH_2CH_2CH_2Si(OCH_3)_3$.

The second polyfluoropolyether silane includes one or more compounds represented by the formula:

$$R_{fb}[R^5CH_2OZ^2Si(Y^2)_3]_2$$

Each Y$^2$ independently represents a hydrolyzable group. Examples include lower alkoxy having from 1 to 3 carbon atoms (e.g., methoxy, ethoxy, and propoxy), halide (e.g., chloride and bromide), and lower alkanoyloxy having from 2 to 4 carbon atoms (e.g., acetoxy and propanoyloxy).

Each Z$^2$ independently represents —R$^3$SR$^4$—, —R$^3$S(=O)R$^4$—, or —R$^3$S(=O)$_2$R$^4$—. R$^3$ and R$^4$ independently represent alkylene groups having from 1 to 12 carbon atoms. In some embodiments, R$^3$ and R$^4$ independently represent alkylene groups having from 1 to 8, 6, or 4 carbon atoms. Examples of R$^3$ and R$^4$ alkylene groups include: methylene; ethane-1,2-diyl; propane-1,2-diyl; propane-1,3-diyl; butane-1,4-diyl; hexane-1-6-diyl; octane-1,8-diyl; isooctane-1,7-diyl; and dodecane-1,10-diyl. One particularly useful group Z$^2$ is —CH$_2$CH$_2$CH$_2$SCH$_2$CH$_2$CH$_2$—.

$R_{fb}$ represents a perfluoroalkylene group having at least 3 carbon atoms, optionally substituted with at least one catenated oxygen atom or —NR$^6$— group, wherein R$^6$ represents a perfluoroalkyl group (e.g., a perfluoroalkyl group having from 1 to 6 carbon atoms or from 1 to 4 carbon atoms). Examples of perfluoroalkylene groups having at least 3 carbon atoms include perfluoropropylene-1,2-diyl, perfluoropropylene-1,3-diyl, perfluorobutylene-1,4-diyl, perfluorooctylenene-1,8-diyl. Examples of perfluoroalkylene groups substituted with at least one catenated oxygen atom or —NR$^6$— group include:
—CF$_2$CF$_2$OCF$_2$CF$_2$—; —CF$_2$(OCF$_2$CF$_2$)$_j$(OCF$_2$)$_k$CF$_2$—,
—CF(CF$_3$)[OCF$_2$CF(CF$_3$)]$_k$(CF$_2$)$_4$O[(CF(CF$_3$)CF$_2$O]$_j$
  CF(CF$_3$)—; —CF(CF$_3$)[OCF$_2$CF(CF$_3$)]$_k$O(CF$_2$)$_3$O
  (CF$_2$)$_3$ O[(CF(CF$_3$)CF$_2$O]$_j$CF(CF$_3$)—; —CF(CF$_3$)
  [OCF$_2$CF(CF$_3$)]$_k$O(CF$_2$)$_3$N(CF$_3$)(CF$_2$)$_3$O[(CF(CF$_3$)
  CF$_2$O]$_j$CF(CF$_3$)—,
wherein j and k are numbers greater than or equal to 0, and j+k is a number in a range of from 0 to 4; and —CF$_2$CF$_2$CF$_2$O [(CF(CF$_3$)CF$_2$O]$_z$CF(CF$_3$)—, wherein z is a number in a range of from 0 to 4.

Each R$^5$ independently represents a covalent bond, or —(OR$^7$)$_b$—, wherein each R$^7$ independently represents a branched perfluoroalkylene group (e.g., a branched perfluoroalkylene group having from 1, 2, 3, or 4 carbon atoms to 6, 8, 10, or 12 carbon atoms), and each b independently represents a number greater than or equal to one (e.g., greater than or equal to one, 2, 3, 4, 6, 8, and/or 12). Exemplary R$^5$ groups include perfluoroethyene-1,2-diyl, perfluoropropylene-1,3-diyl, perfluorobutylene-1-4-diyl, perfluoropoly(propyleneoxy) groups, and perfluoropoly(oxypropylene) groups.

In some embodiments, the formula representing the second polyfluoropolyether silane can be more specifically written as:

$$(Y^2)_3SiZ^2OCH_2CF_2R^9CF_2CH_2OZ^2Si(Y^2)_3$$

wherein R$^9$ is a divalent group consisting of from 1 to 50 (e.g., from 8 to 20, from 8 to 15, and/or from 9 to 12) —OCF$_2$CF$_2$— groups randomly interspersed with from 3 to 40 (e.g., from 3 to 30, from 1 to 20, from 1 to 15, and/or from 1 to 12) —OCF$_2$— groups.

While only integral values (i.e., corresponding to integers) of m, p, and q (as defined hereinabove) are possible for individual compounds, it will be recognized that mixtures of such compounds can have non-integral (not corresponding to integers) values and are contemplated to be within the scope of the present disclosure as, for example, in the representative formulas herein.

Examples of useful second polyfluoropolyether silanes include the following approximate average structures:

$(CH_3O)_3SiCH_2CH_2CH_2SCH_2CH_2CH_2OCH_2CF_2(OCF_2CF_2)_m(OCF_2)_qCF_2CH_2O$—$CH_2CH_2CH_2SCH_2CH_2CH_2Si(OCH_3)_3$, $(CH_3CH_2O)_3SiCH_2CH_2CH_2SCH_2CH_2OCH_2CF_2(OCF_2CF_2)_m$—$(OCF_2)_q$ $CF_2CH_2OCH_2CH_2SCH_2CH_2CH_2Si(OCH_2CH_3)_3$, $(CH_3CH_2O)_3SiCH_2CH_2CH_2SCH_2CH_2CH_2OCH_2CF_2(OCF_2CF_2)_m$—$(OCF_2)_q$ $CF_2CH_2OCH_2CH_2CH_2SCH_2CH_2CH_2Si(OCH_2CH_3)_3$, wherein m is a number in a range of from 1 to 50, and wherein q is a number in a range of from 3 to 40; $(CH_3CH_2O)_3Si(CH_2)_3S(CH_2)_3OCH_2CF(CF_3)[OCF_2CF(CF_3)]_kO$—$(CF_2)_4O[(CF(CF_3)CF_2O]_jCF(CF_3)CH_2$—$O$—$(CH_2)_3S(CH_2)_3Si(OCH_2CH_3)_3$; $(CH_3O)_3Si(CH_2)_3S(CH_2)_3OCH_2CF(CF_3)[OCF_2CF(CF_3)]_kO(CF_2)_3O(CF_2)_3O$—$[(CF(CF_3)CF_2O]_jCF(CF_3)CH_2$—$O$—$(CH_2)_3S(CH_2)_3Si(OCH_3)_3$, and $(CH_3CH_2O)_3Si(CH_2)_3S(CH_2)_3OCH_2CF(CF_3)[OCF_2CF(CF_3)]_kO(CF_2)_3N(CF_3)$—$(CF_2)_3O[(CF(CF_3)CF_2O]_xCF(CF_3)CH_2$—$O$—$(CH_2)_3S(CH_2)_3Si(OCH_2CH_3)_3$, wherein j and k are numbers greater than or equal to 0, and j+k is a number in a range of from 0 to 4; and $(CH_3O)_3Si(CH_2)_3S(CH_2)_3OCH_2CF_2CF_2CF_2O[(CF(CF_3)CF_2O]_kCF(CF_3)CH_2O$—$(CH_2)_3S(CH_2)_3Si(OCH_3)_3$, wherein z is a number in a range of from 0 to 4.

The first and second polyfluoropolyether silanes can be synthesized using conventional techniques. For example, methods such as those described in U.S. Pat. No. 7,294,731 B1 (Flynn et al.) can be readily adapted to prepare polyfluoropolyether silanes used in practice of the present disclosure. Further illustrative techniques are shown in the Examples section hereinbelow.

Polyfluoropolyether silanes typically include a distribution of oligomers and/or polymers. Desirably, in such a distribution, the amount of polyfluoropolyether silane having a polyfluoropolyether segment having a weight average molecular weight less than 750 is not more than 10 percent by weight, more desirably not more than 5 percent by weight, more desirably not more than one percent by weight, and even more desirably nearly zero or zero percent by weight, based on the total amount of the polyfluoropolyether silane in the distribution.

The amount of the first polyfluoropolyether silane is from 51 to 95 parts by weight based on the combined weight of the first and second polyfluoropolyether silanes. In some embodiments, the amount of the first polyfluoropolyether silane is in a range of from 60 to 95 parts by weight, or from 65 to 75 parts by weight based on the combined weight of the first and second polyfluoropolyether silanes. Similarly, the amount of the second polyfluoropolyether silane is in a range of from 5 to 49 parts by weight based on the combined weight of the first and second polyfluoropolyether silanes. In some embodiments, the amount of the second polyfluoropolyether silane is from 20 to 40 parts by weight, or from 25 to 35 parts by weight based on the combined weight of the first and second polyfluoropolyether silanes.

In some embodiments, the fluorinated composition further includes at least one organic solvent. Any organic solvent or blend of organic solvents should desirably be capable of dissolve or suspend at least about 0.01 percent by weight of one or more of the polyfluoropolyether silanes. In some embodiments, it is desirable that the solvent or mixture of solvents have a solubility for water of at least about 0.1 percent by weight, and for certain of these embodiments, a solubility for acid of at least about 0.01 percent by weight.

Suitable organic solvents, or mixtures of solvents may be selected from aliphatic alcohols such as, for example, methanol, ethanol, and isopropanol; ketones such as acetone and methyl ethyl ketone; esters such as ethyl acetate and methyl formate; ethers such as diethyl ether, diisopropyl ether, methyl t-butyl ether, and dipropylene glycol monomethyl ether (DPM); hydrocarbons solvents such as alkanes, for example, heptane, decane, and paraffinic solvents; fluorinated hydrocarbons such as perfluorohexane and perfluorooctane; partially fluorinated hydrocarbons, such as pentafluorobutane; and hydrofluoroethers such as methyl perfluorobutyl ether and ethyl perfluorobutyl ether.

For certain of these embodiments, the fluorinated solvent is a hydrofluoroether. For certain of these embodiments, the hydrofluoroether is methyl perfluorobutyl ether.

The fluorinated composition may further comprise one or more acids. Exemplary acids include acetic acid, citric acid, formic acid, triflic acid, perfluorobutyric acid, sulfuric acid, hydrochloric acid, and mixtures thereof.

Figure 1:
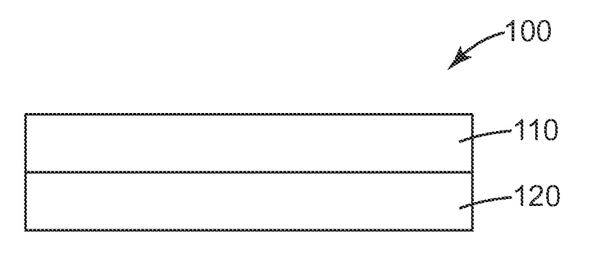
FIG. 1 is a schematic side view of an exemplary article according to the present disclosure.

The fluorinated composition may be applied to at least a portion of a surface of a substrate resulting in an article according to the present disclosure. For example, referring now to FIG. 1, article 100 comprises layer 110 on substrate 120.

The fluorinated composition may be applied to the surface of the substrate using a variety of coating methods. Such methods include but are not limited to spraying, dipping, rolling, brushing, spreading, flow coating, and vapor deposition. Typically, the fluorinated composition is coated on the substrate such that after an optional drying, a monolayer of the fluorinated composition results. Typically, such a monolayer is from about 0.001 to about 1 micrometer thick, more typically from about 0.001 to about 0.10 microns thick.

The substrate to be treated may be pre-cleaned by methods known to the art to remove contaminants prior to applying the fluorinated composition. One useful pre-cleaning method is exposure to an oxygen plasma. For this pre-cleaning, pressures in the chamber are maintained between 1.3 Pa (10 mtorr) and 27 Pa (200 mtorr). Plasma is generated with RF power levels of between 500 W and 3000 W. A solvent-washing step with an organic solvent such as acetone or ethanol or acid etch treatment may also be included prior to the exposure to oxygen plasma.

If using vapor deposition, the conditions under which the fluorinated composition is vaporized during chemical vapor deposition may vary according to the structure and molecular weight of the polyfluoropolyether silane. For certain embodiments, the vaporizing may take place at pressures less than about 1.3 Pa (about 0.01 torr), at pressures less than about 0.013 Pa (about $10^{-4}$ torr) or even about 0.0013 Pa to about 0.00013 Pa (about $10^{-5}$ torr to about $10^{-6}$ torr). For certain of these embodiments, the vaporizing may take place at temperatures of at least about 80° C., at least about 100° C., at least about 200° C., or at least about 300° C. Vaporizing may include imparting energy by, for example, conductive heating, convective heating, and/or microwave radiation heating.

In some embodiments, for example, those in which the surface created by plasma deposition, vapor deposition method may reduce opportunities for contamination of the surface of the substrate through additional handling and exposure to the environment, leading to correspondingly lower yield losses. Furthermore, as the layer is formed by plasma deposition, it can be more efficient to coat the fluorinated composition in the same chamber or a connected vacuum chamber. Additionally, the fluorinated composition may not need acid conditions and/or additional heating for curing.

Useful vacuum chambers and equipment are known in the art. Examples include the PLASMATHERM Model 3032 (available from Plasmatherm of Kresson, N.J.) and the 900 DLS (available from Satis Vacuum of America of Grove Port, Ohio).

Applying the fluorochemical composition by vapor deposition typically includes placing it and the substrate into a chamber, decreasing the pressure in the chamber, and heating the fluorochemical composition. The fluorochemical composition is typically maintained in a crucible, but in some embodiments, it is imbibed in a porous matrix, such as a ceramic pellet or a metallic mesh, and the pellet heated in the chamber.

Sufficient energy is applied to the fluorochemical composition to change it to a vapor state, which vapor subsequently comes to rest in film form on the substrates, often after combining with other components. Electrostatic and/or electromagnetic fields may be used in the process of converting the source material to its vapor phase as well as to direct the coating particles toward the substrate. Useful vapor deposition methods include, for example, sputtering, reactive sputtering, evaporation, reactive evaporation, ion-assisted reactive evaporation, ion-beam assisted deposition, cathodic arc evaporation, unbalanced magnetron sputtering, high power impulse magnetron sputtering (HIPIMS), and thermal and electron beam (e-beam) evaporation. Vapor deposition apparatuses known in the art such as the apparatus disclosed in U.S. Pat. No. 4,556,471 (Bergman et al.) can be used.

The fluorinated composition may undergoes chemical reaction with the surface of the substrate, for example, with a layer comprising the silicon, oxygen, and hydrogen on the substrate surface having —SiOH groups to form a durable coating through the formation of covalent bonds including bonds in Si—O—Si groups. For the preparation of a durable coating, sufficient water should be typically present to cause hydrolysis of the hydrolyzable groups described above so that condensation to form Si—O—Si groups takes place, and thereby curing takes place. The water may be, for example, present either in the coating composition, adsorbed to the substrate surface, or from the ambient atmosphere. Typically, sufficient water is present for the preparation of a durable coating if the coating method is carried out at room temperature in an atmosphere containing water, for example, an atmosphere having a relative humidity of about 30% to about 50%.

A substrate to be coated can typically be contacted with the coating composition at room temperature (typically from 15° C. to 30° C., and more typically from 20° C. to 25° C.). Alternatively, the coating composition can be applied to substrates which are preheated at a temperature of, for example, between 60° C. and 150° C. Following application of the fluorinated composition, the coated substrate can be dried and the resulting coating cured at ambient temperature (e.g., about 15° C. to about 30° C.) or elevated temperature (e.g., at about 40° C. to about 300° C.) for a time sufficient for the curing to take place.

Any substrate may be used provided that it has a coatable surface. Typically, the substrate is solid. Exemplary substrates may comprise metal, ceramic, synthetic and/or natural polymers, and/or glass. For best efficacy, the substrate should have a surface with groups capable of forming covalent bonds to the first and second polyfluoropolyether silanes such as, for example, hydroxyl groups.

Useful metals can be selected, for example, from the group consisting of chromium, iron, aluminum, copper, nickel, zinc, tin, stainless steel, brass, and alloys and combinations thereof.

Examples of substrates include, but are not limited to, kitchen and bathroom faucets, taps, handles, spouts, sinks, drains, hand rails, towel holders, curtain rods, dish washer panels, refrigerator panels, stove tops, stove panels, oven panels, microwave panels, exhaust hoods, grills, metal wheels or rims, scissor blades, paper cutters, paper shredders, shaving blades, cutting tools, stamping dies, molds, windows, mirrors, eyeglass lenses, tile, tubs, toilets, and sinks In some embodiments, the suitability of the surface of the substrate may be improved by deposition of a primer, or some other surface physical or chemical modification technique. Plasma deposition techniques can be used. For example, in some embodiments, a layer comprising silicon, oxygen, and hydrogen, known in the art as diamond-like glass, is deposited on the surface of the substrate prior to coating it with the fluorochemical composition.

Forming a diamond-like glass layer (e.g., comprising silicon, oxygen, and hydrogen) on at least a portion of the surface of the substrate by plasma deposition can be carried out in a suitable reaction chamber having a capacitively-coupled system with at least one electrode powered by an RF (radio frequency) source and at least one grounded electrode. Details concerning materials and methods for preparing diamond-like glass layers can be found, for example, in U.S. Pat. Nos. 6,696,157 (David et al.) and 6,878,419 (David et al.).

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the examples and the rest of the specification are by weight. Unless otherwise noted all chemicals were obtained from, or are available from chemical suppliers such as, for example, Aldrich Chemical Company, Milwaukee, Wis.

Preparative Example 1

The following description describes the preparation of $(CH_3O)_3Si(CH_2)_3S(CH_2)_3OCH_2CF_2(OCF_2CF_2)_m(OCF_2)_q CF_2CH_2—O—(CH_2)_3—S(CH_2)_3Si(OCH_3)_3$ (PE1).

FOMBLIN Z DOL perfluoropolyether diol (157 g, equivalent weight=950 g/equivalent, m and q vary so that the equivalent weight averages to be 950, obtained from Solvay Solexis, Houston, Tex.), was dissolved in a mixture of 3M NOVEC HFE 7100 hydrofluoroether (150 mL, obtained from 3M Company, St. Paul, Minn. under the trade designation NOVEC ENGINEERED FLUID HFE 7100) and dimethoxyethane (100 mL) in a 1-L, 3-necked round-bottom flask equipped with a thermocouple, addition funnel, and overhead stirrer. To this mixture was added potassium hydroxide (14.0 grams, dissolved in 9 mL water), and the mixture was heated to between 40° C. and 50° C. with stirring for one hour. Tetrabutylammonium bromide (3.0 g dissolved in 1 mL water) was added followed by the dropwise addition through the addition funnel of allyl bromide (31 g) over a period of about one hour. The reaction mixture was then stirred for 16 hours at 45° C. A distillation head was attached and the solvents and water were distilled until the pot temperature reached about 120° C. Afterward, the reaction mixture was cooled and a vacuum of 0.02 atmosphere (2 kPa) applied as the temperature was again raised to about 120° C. The mixture was held at this temperature for about one hour. After cooling to room temperature, 250 mL of 3M NOVEC HFE 7100 hydrofluoroether was added, and the mixture was filtered under vacuum through a sintered glass funnel to remove the solids. The solids were washed with a further 75 mL of 3M NOVEC HFE 7100 hydrofluoroether. The filtrate was washed one time with one percent aqueous hydrochloric acid, the lower fluorochemical phase-separated, and the solvent removed by rotary evaporation to give 158 grams of the resultant bis(allyl ether) of FOMBLIN Z DOL as an amber clear liquid. Infrared analysis showed that the O—H absorption band of the perfluoropolyether diol had completely disappeared.

The bis(allyl ether) (35.8 g, 0.017 mol), 13.5 g of $HS(CH_2)_3Si(OCH_3)_3$ (0.067 mol), 100 g of ethyl acetate, and 0.16 g of 2,2'-azobis(2-methylpropionitrile) (obtained as VAZO 64 from E.I. du Pont de Nemours and Co., Wilmington, Del.) were combined in a 250 ml, round-bottom flask equipped with a thermocouple temperature probe, magnetic stirring bar and a water-filled condenser under a nitrogen atmosphere. The mixture was then degassed four times by alternately pulling a vacuum from a water aspirator and breaking the vacuum with dry nitrogen gas using a Firestone valve, and the mixture was heated to 70° C. for 16 hours. The solvent was removed by rotary evaporation, and the excess mercaptosilane starting material removed by vacuum distillation at 0.002 atmospheres (0.2 kPa) to yield 39.6 g of $(CH_3O)_3Si(CH_2)_3S(CH_2)_3OCH_2CF_2(OCF_2CF_2)_m(OCF_2)_g$ $CF_2$—$CH_2$—O—$(CH_2)_3S(CH_2)_3Si(OCH_3)_3$, $M_n$=2372 g/mol.

Preparative Example 2

The following description describes the preparation of $CF_3CF_2CF_2O[CF(CF_3)CF_2O]_pCF(CF_3)CH_2$—O—$(CH_2)_3S$ $(CH_2)_3Si(OCH_3)_3$ (PE2).

Isopropyl alcohol (300 mL) was placed in a 2-L three-necked round-bottom flask equipped with an overhead stirrer, temperature sensor, and addition funnel, and cooled to <10° C. using a water/ice bath. Sodium borohydride (34 g, 0.9 mol) was added in several small portions. $CF_3CF_2CF_2O[CF(CF_3)$ $CF_2O]_pCF(CF_3)CO_2CH_3$ (979 g, $M_n$=1379, 0.71 mol), prepared by methanolysis of the oligomeric acyl fluorides prepared essentially as described in U.S. Pat. No. 3,350,808 for the oligomerization of hexafluoropropylene oxide was added dropwise with stirring under nitrogen. The temperature was maintained between 0° C. and 10° C. The ester addition was completed in approximately one hour. After the addition of the ester was complete, the reaction was allowed to run for an additional three hours with continuous stirring and maintaining the temperature between 0° C. and 10° C. The reaction mixture was then allowed to warm to room temperature and stirred overnight.

An aqueous solution of ammonium chloride (600 mL of a 20 weight percent aqueous solution) was slowly added dropwise to the now thickened mixture at room temperature. The temperature was kept below 35° C. using a cooling bath. After adding all of the ammonium chloride solution, the mixture was stirred at room temperature for about one hour. At the end of that time, stirring was stopped and the phases were allowed to separate. The upper aqueous layer was siphoned off and the lower alcohol phase was washed two additional times using 500 mL portions of deionized water. The residue was dissolved in 3M NOVEC HFE 7100 hydrofluoroether, and washed once more with water which had been acidified with aqueous hydrochloric acid. After phase separation, the residual solvent was removed by distillation under reduced pressure using a rotary evaporator at 60° C. to yield the alcohol, $CF_3CF_2CF_2O[CF(CF_3)CF_2O]_pCF(CF_3)CH_2OH$, $M_n$=1350 g/mol, as a colorless oil.

The alcohol prepared above (503.8 g, 0.373 mol) was placed in a 2-L three-necked round-bottom flask equipped with an overhead stirrer, thermocouple, addition funnel and condenser. To this flask were added 3M NOVEC HFE 7100 hydrofluoroether (475 mL), dimethoxyethane (320 mL), and potassium hydroxide (31.6 g, dissolved in 30 mL water), and the mixture was heated to between 40° C. and 50° C. with stirring for one hour. Tetrabutylammonium bromide (14.2 g dissolved in about 5 mL of water) was added followed by the dropwise addition through the addition funnel of allyl bromide (74.2 g, 0.61 mol) over a period of about one hour. The reaction mixture was then stirred for 16 hours at 45° C. A distillation head was attached, and the solvents and water were distilled until the pot temperature reached about 120° C. Afterward, the reaction mixture was cooled, a vacuum of 0.02 atmospheres (2 kPa) was applied, and the temperature was again raised to about 120° C. The mixture was held at this temperature for about one hour. After cooling to room temperature, 500 mL of 3M NOVEC HFE 7100 hydrofluoroether was added, and the mixture was filtered under vacuum through a sintered glass funnel to remove the solids. The solids were washed with a further 75 mL of 3M NOVEC HFE 7100 hydrofluoroether. The filtrate was washed one time with 2N aqueous hydrochloric acid, the lower fluorochemical phase separated and the solvent removed by rotary evaporation to give 496 g of the corresponding allyl ether as an amber clear liquid. Infrared analysis showed that the O—H absorption band of the alcohol had completely disappeared.

The allyl ether (25 g, 0.018 mol, $M_n$=1390 g/mol), $HS(CH_2)_3Si(OCH_3)_3$ (14.5 g, 0.074 mol), 50 g of ethyl acetate, 50 g of 3M NOVEC HFE 7100 hydrofluoroether, and 0.1 g of 2,2'-azobis(2-methylpropionitrile) (obtained as VAZO 64 from E.I. du Pont de Nemours and Co.) were combined in a 250-mL round-bottom flask equipped with a thermocouple temperature probe, magnetic stir bar and a water-filled condenser under a nitrogen atmosphere. The mixture was then degassed four times by alternately pulling a vacuum from a water aspirator and breaking the vacuum with dry nitrogen gas using a Firestone valve, and the mixture was heated to 70° C. for 16 hours. The solvent was removed by rotary evaporation, and the residue dissolved in perfluorinated liquid (obtained from 3M Company, St. Paul, Minn. as PERFORMANCE FLUID PF-5060), and the excess 3-mercaptopropyltrimethoxysilane starting material removed by washing the solution with methyl ethyl ketone followed by phase separation and an additional methyl ethyl ketone wash of the fluorochemical phase. The solvent was removed by rotary evaporation yielding 20 g of the mercaptosilane adduct, $C_3F_5O[CF(CF_3)CF_2O]_pCF(CF_3)CH_2$—O—$(CH_2)_3$ $S(CH_2)_3Si(OCH_3)_3$, $M_n$=1590 g/mol.

Preparative Example 3

The following description describes the preparation of $CF_3CF_2CF_2O[CF(CF_3)CF_2O]_pCF(CF_3)CH_2$—O—$(CH_2)_3S$ $(CH_2)_3Si(OCH_3)_3$ (PE3).

$CF_3CF_2CF_2O[CF(CF_3)CF_2O]_pCF(CF_3)CO_2H$ (75 g, 0.013 mol, obtained as KRYTOX PERFORMANCE LUBRICANT 157 FSH, $M_n$=5692, from E.I. du Pont de Nemours and Co.), and thionyl chloride (156 g, 1.3 mol) were combined in a 250-mL round-bottom flask equipped with a thermocouple and condenser under a nitrogen atmosphere. To this mixture was added about 2 mL of dimethyl formamide, and the mixture was heated to 75° C. for about 18 hours. The reaction mixture was cooled, and fluorinated liquid (obtained as FLUORINERT ELECTRONIC LIQUID FC-6003 from 3M Company) and a small amount of 3M NOVEC HFE 7100 hydrofluoroether were added to the mixture and the phases separated. The lower fluorochemical phase was then added to a separatory funnel and treated directly with excess methanol to convert the acid chloride to the methyl ester. The methanol was removed and the ester washed one additional time with methanol. The methanol was removed by rotary evaporation to give 73.2 g of the methyl ester $CF_3CF_2CF_2O[CF(CF_3)CF_2O]_pCF(CF_3)CO_2CH_3$.

The intermediate alcohol, $CF_3CF_2CF_2O[CF(CF_3)CF_2O]_pCF(CF_3)CH_2OH$, was prepared essentially according to the procedure described in Preparative Example 2 using the following charges: 73.2 g of the methyl ester prepared above (0.013 mol), 2.0 g of sodium borohydride (0.053 mol), 50 mL of isopropanol, and 50 mL of 3M NOVEC HFE 7100 hydrofluoroether. The reaction was run at ambient temperature instead of using a cold bath. After stirring the reaction for 16 hours, 50 mL of an ammonium chloride solution (20 weight percent in water) was added followed by an additional charge of about 200 mL of 3M NOVEC HFE 7100 hydrofluoroether. The fluorochemical phase was separated and washed once with an equal volume of water to which a little brine was added. The solvent was then removed by rotary evaporation, and the product was used without further purification.

The intermediate allyl ether, $CF_3CF_2CF_2O[CF(CF_3)CF_2O]_pCF(CF_3)CH_2OCH_2CH=CH_2$, was prepared by a modification of the procedure of Preparative Example 2. The alcohol $CF_3CF_2CF_2O[CF(CF_3)CF_2O]_pCF(CF_3)CH_2OH$ (42 g, $M_n$=5628 g/mol, 0.0075 mol) was placed in a 500-mL three-necked round-bottom flask equipped with an overhead stirrer, thermocouple, addition funnel, and condenser. To this flask were added 225 mL of 3M NOVEC HFE 7200 hydrofluoroether and 0.7 g of potassium hydroxide dissolved in 5 mL of water, and the mixture was heated to 40° C. with stirring for one hour. Tetrabutylammonium bromide (1.0 g dissolved in 1 mL of water) was added followed by the addition of allyl bromide (6.5 g, 0.054 mol). The reaction mixture was then stirred for 16 hours at 40° C. A distillation head was attached, and the solvents and water were distilled until the pot temperature reached about 120° C. Afterward, the reaction mixture was cooled, and a vacuum of 0.02 atmospheres (2 kPa) was applied as the temperature was again raised to about 120° C. The mixture was held at this temperature for about one hour. After cooling to room temperature, 100 mL of 3M NOVEC HFE 7100 hydrofluoroether was added, and the mixture was filtered under vacuum through a sintered glass funnel to remove the solids. The solids were washed with a further 75 mL of 3M NOVEC HFE 7100 hydrofluoroether. The filtrate was treated with about 10 g of silica gel and 20 g of filter aid, and then refiltered to remove a slight cloudiness and obtain 37.5 g of the corresponding allyl ether $CF_3CF_2CF_2O[CF(CF_3)CF_2O]_pCF(CF_3)CH_2OCH_2CH=CH_2$ as a clear oil.

The allyl ether (10.4 g, 0.0018 mol, $M_n$=5668 g/mol), 1.3 g of $HSCH_2CH_2CH_2Si(OCH_3)_3$ (0.007 mol), 10 g of ethyl acetate, 25 g of 3M NOVEC HFE 7200 hydrofluoroether, and 0.1 g of 2,2'-azobis(2-methylpropionitrile) (obtained as VAZO 64 from E.I. du Pont de Nemours, 0.1 g) were combined in a 100 mL round-bottom flask equipped with a thermocouple temperature probe, magnetic stir bar and a water-filled condenser under a nitrogen atmosphere. The mixture was then degassed four times in the standard manner by alternately pulling a vacuum from a water aspirator and breaking the vacuum with dry nitrogen gas using a Firestone valve and the mixture was heated to 75° C. for 16 hours. The solvent was removed by rotary evaporation and the residue dissolved in a perfluorinated liquid (obtained from 3M Company as PERFORMANCE FLUID PF-5060) and the excess mercaptosilane starting material removed by washing the PF-5060 solution with methyl ethyl ketone followed by phase separation. The solvent was removed by rotary evaporation yielding 9.6 g of $CF_3CF_2CF_2O[CF(CF_3)CF_2O]_pCF(CF_3)CH_2—O—(CH_2)_3S(CH_2)_3Si(OCH_3)_3$, $M_n$=5860 g/mol.

Preparative Example 4

The following description describes the preparation of $(CH_3CH_2O)_3Si(CH_2)_3S(CH_2)_3OCH_2CF(CF_3)[OCF_2CF(CF_3)]_nO(CF_2)_4O—[(CF(CF_3)CF_2O]_mCF(CF_3)CH_2—O—(CH_2)_3S(CH_2)_3Si(OCH_2CH_3)_3$.

This silane was prepared essentially as in Example 1, except with the following charges and changes in solvent: The intermediate fluorochemical diol was derived from the reaction of tetrafluorosuccinyl fluoride with hexafluoropropylene oxide and consisted of a mixture of isomers (m+n=0 to 2) and was prepared essentially as described in U.S. Pat. No. 3,574,770 (Stump, Jr. et al.). The intermediate bis(allyl)ether was prepared from this diol as follows. The diol (100 g, $M_n$=1220 g/mol, 0.082 mol) was placed in a 500-mL three-necked round-bottom flask equipped with an overhead stirrer, thermocouple, addition funnel, and condenser. To this flask were added 150 mL of 3M NOVEC HFE 7200 hydrofluoroether, 100 mL of dimethoxyethane, and 14 g of potassium hydroxide (0.21 mol) dissolved in 9 mL water, and then the mixture heated to between 40° C. and 50° C., and stirred for one hour. Tetrabutylammonium bromide (3 g, dissolved in about 1 mL of water) was added, followed by dropwise addition through the addition funnel of 31 g of allyl bromide (0.256 mol) over a period of about one hour. The reaction mixture was then stirred for 16 hours at 45° C. A distillation head was attached and the solvents and water were distilled until the pot temperature reached about 120° C. Afterward, the reaction mixture was cooled and a vacuum of 0.02 atmospheres (2 kPa) applied as the temperature was again raised to about 120° C. The mixture was held at this temperature for about one hour. After cooling to room temperature, 250 mL of 3M NOVEC HFE 7100 hydrofluoroether was added, and the mixture was filtered under vacuum through a sintered glass funnel to remove the solids. The solids were washed with a further 75 mL of 3M NOVEC HFE 7100 hydrofluoroether. The filtrate was washed once with one weight percent aqueous hydrochloric acid, and the lower fluorochemical phase was separated and used without further purification resulting in 92 g of the corresponding bis(allyl ether), $M_n$=1302 g/mol.

The bis(allyl ether) (25 g, 0.019 mol), 18.3 g of $HSCH_2CH_2CH_2Si(OCH_2CH_3)_3$ (0.078 mol), 100 g of ethyl acetate, and 0.1 g of 2,2'-azobis(2-methylpropionitrile) (obtained as VAZO 64 from E.I. du Pont de Nemours and Co.) were combined in a 250-mL round-bottom flask equipped with a thermocouple temperature probe, magnetic stir bar, and a water filled condenser under a nitrogen atmosphere. The mixture was then degassed four times in the standard manner by alternately pulling a vacuum from a water aspirator and breaking the vacuum with dry nitrogen gas using a Firestone valve and the mixture was heated to 65° C. for 16 hours. The solvent was removed by rotary evaporation and the residue mixed with a perfluorinated liquid (obtained from 3M Company as PERFORMANCE FLUID PF-5060), and the mixture washed with methanol to remove the excess mercaptosilane starting material. The solvent was removed by rotary evaporation yielding 12.9 g of the corresponding mercaptosilane product, $(CH_3CH_2O)_3Si(CH_2)_3S(CH_2)_3OCH_2CF(CF_3)$ $[OCF_2CF(CF_3)]_nO(CF_2)_4O—[(CF(CF_3)CF_2O]_mCF(CF_3)CH_2—O—(CH_2)_3S(CH_2)_3Si(OCH_2CH_3)_3$, $M_n$=1774 g/mol.

Preparative Example 5

The following description describes the preparation of $CF_3CF_2CF_2O[CF(CF_3)CF_2O]_pCFC(=O)NHCH_2CH_2CH_2Si(OCH_3)_3$ (PE5).

In a glass bottle $CF_3CF_2CF_2O[CF(CF_3)CF_2O]_pCF(CF_3)CO_2CH_3$ (13.79 grams, $M_n$=1379, 0.01 mol) and 4 g of $H_2NCH_2CH_2CH_2Si(OCH_3)_3$ (excess of 2 molar eq.) was mixed, purged with nitrogen, and then stirred at room temperature for 24 hours. The resultant clear reaction mixture was then washed with methanol (5×50 g portions) in a separatory funnel. The lower portion was collected and dried with a vacuum pump for 3 hours at room temperature resulting in $CF_3CF_2CF_2O[CF(CF_3)CF_2O]_pCFC(=O)NHCH_2CH_2CH_2Si(OCH_3)_3$, 1510 g/mol.

Method for Plasma Deposition of Silicon—Containing Layer

A Plasma-Therm Model 3032 batch reactor (obtained from Plasma-Therm, LLC, St. Petersburg, Fla.) configured for reactive ion etching (RIE) with a 1.34-meter lower powered electrode and central gas pumping was used for depositing silicon containing layers. The chamber was pumped by a roots blower (Edwards Model EH1200, obtained from Absolute Vacuum Products Limited, West Sussex, UK) backed by a dry mechanical pump (Edwards Model iQDP80, obtained from Absolute Vacuum Products Limited, West Sussex, UK). RF power was delivered by a 5 kW, 13.56 MHz solid-state generator (RFPP Model RF50S0, obtained from Advanced Energy Industries, Fort Collins, Colo.) through an impedance matching network. The system had a nominal base pressure of 0.666 Pa. The flow rates of the gases were controlled by MKS flow controllers (obtained from MKS Instruments, Andover, Mass.).

Samples of the substrates were placed on the powered electrode of the batch plasma apparatus described above. The plasma treatment was done in a series of treatment steps. First, the substrates were treated with oxygen plasma by flowing oxygen gas at a flow rate of 500 standard cm$^3$/min and plasma power of 500 watts for 60 seconds. After the oxygen plasma treatment, a diamond-like glass film was deposited by flowing tetramethylsilane gas at a flow rate of 150 standard cm$^3$/min, plasma power of 500 watts for 4 seconds. After deposition of the diamond-like glass film, the substrates were exposed to oxygen plasma at a flow rate of 500 standard cm$^3$/min, plasma power of 500 watts for 60 seconds.

Method for Coating Stainless Steel Metal Fittings with Coating Compositions

Substrates (i.e., stainless steel fittings obtained from Kohler Company, Kohler, Wis.) were prepared for coating with the coating compositions by first dipping them in isopropyl alcohol (IPA), and then rubbing them with cotton wipes (obtained as TEXWIPE TX309 from ITW Texwipe Company, Kernersville, N.C.) before deposition of DLG coatings. The test substrates were then coated with diamond-like glass (DLG) coatings according to the Method for Plasma Deposition of Silicon-Containing Layer described above. After DLG deposition, the articles were dipped in the respective coating formulations, and dried as such in an oven at 250° C. and ambient pressure for approximately 30 minutes. Then, they were cooled down to room temperature in air and wiped 3 times with TEXWIPES TX 309 cotton wipes.

Method for Easy Cleanability Test

Easy cleanability of the coated substrates was tested using a Sharpie test as follows: A blue permanent marker (obtained as SHARPIE marker from Sanford Corporation, Oak Brook, Ill.) was used for this purpose to place marks 3 times at the same place on the article. An easy cleanability ranking of 1 means the marks beaded up, and it was not possible to write on the article. An easy cleanability ranking of 5 means the marks were very difficult to wipe off. Intermediate ratings are graded on a scale from 1 to 5. The rankings reported are an average of three tests. The coated samples were water treated by immersing them in 500-mL glass bottles filled with distilled water and placed in an oven set at 75° C. for 100 hours. The procedure was repeated on these water treated samples and ranked accordingly. An easy cleanability ranking of 1 or 2 after water treatment represents a satisfactory response, and rating 3 to 5 are unacceptable.

Examples 1-6 and Comparative Examples 1-12

Coating compositions of Examples 1-6 and Comparative Examples 1-14 were prepared by adding the indicated silane compound to 3M NOVEC HFE 7100 hydrofluoroether to achieve the indicated concentrations. Comparative Example 10 was prepared by mixing 4.5 g of the silane compound of Preparative Example 5, $CF_3CF_2CF_2O[CF(CF_3)CF_2O]_pCFC(=O)NHCH_2CH_2CH_2Si(OCH_3)_3$, prepared as described above and 0.5 g of ECC-1000 EASY CLEAN COATING solution (obtained from 3M Company) in 95 g of 3M NOVEC HFE 7100 hydrofluoroether. Comparative Example 11 was prepared by mixing 5 g ECC-1000 EASY CLEAN COATING solution in 95 g of 3M NOVEC HFE 7100 hydrofluoroether, while Comparative Example 12 was prepared by mixing 5 g of NOVEC EGC-1720 ELECTRONIC COATING solution (obtained from 3M Company) in 95 g of 3M NOVEC HFE 7100 hydrofluoroether. The compositions of Examples 1-6 and Comparative Examples 1-12 and 14 were then coated on stainless steel fitting samples following the method for coating stainless steel metal fittings with coating compositions described above. Comparative Example 13 was coated on a stainless steel fitting sample which had not been coated with DLG, but was otherwise treated in the same manner as the other samples. The coated samples were then tested for their easy cleanability following the method for easy cleanability test described above. For each of Examples 1-6 and Comparative Examples 1-12, their easy cleanability ratings before and after hot water treatments are reported in Table 1. In Table 1 (below), "wt. %" means weight percent.

TABLE 1

| | CONCENTRATION OF SILANE COMPOUND IN HFE-7100 | EASY CLEAN-ABILITY RANKING | EASY CLEAN-ABILITY RANKING AFTER WATER TREATMENT |
|---|---|---|---|
| EXAMPLE 1 | 4.5 wt. % of PE2, 0.5 wt. % of PE4 | 1 | 1 |
| EXAMPLE 2 | 4.5 wt. % of PE2, 0.5 wt. % PE1 | 1 | 1 |
| EXAMPLE 3 | 4.5 wt. % of PE3, 0.5 wt. % PE1 | 1 | 2 |
| EXAMPLE 4 | 4.5 wt. % of PE3, 0.5 wt. % PE4 | 1 | 2 |
| EXAMPLE 5 | 0.3 wt. % of PE2, 0.2 wt. % PE1 | 1 | 1 |

TABLE 1-continued

| | CONCENTRATION OF SILANE COMPOUND IN HFE-7100 | EASY CLEAN-ABILITY RANKING | EASY CLEAN-ABILITY RANKING AFTER WATER TREATMENT |
|---|---|---|---|
| EXAMPLE 6 | 0.475 wt. % of PE3, 0.025 wt. % PE1 | 1 | 1 |
| COMPARATIVE EXAMPLE 1 | 0.1 wt. % of PE1 | 1 | 3 |
| COMPARATIVE EXAMPLE 2 | 0.5 wt. % of PE1 | 1 | 4 |
| COMPARATIVE EXAMPLE 3 | 0.2 wt. % of PE2 | 1 | 5 |
| COMPARATIVE EXAMPLE 4 | 1 wt. % of PE2 | 1 | 3 |
| COMPARATIVE EXAMPLE 5 | 5 wt. % of PE2 | 1 | 4 |
| COMPARATIVE EXAMPLE 6 | 0.2 wt. % of PE3 | 1 | 3 |
| COMPARATIVE EXAMPLE 7 | 1 wt. % of PE3 | 1 | 2 |
| COMPARATIVE EXAMPLE 8 | 5 wt. % of PE3 | 1 | 3 |
| COMPARATIVE EXAMPLE 9 | 5 wt. % of PE5 | 1 | 5 |
| COMPARATIVE EXAMPLE 10 | 4.5 wt. % of PE5, 0.5 wt. % of ECC-1000 | 1 | 3 |
| COMPARATIVE EXAMPLE 11 | 5 wt. % of ECC-1000 | 1 | 2 |
| COMPARATIVE EXAMPLE 12 | 0.1 wt. % of ECG-1720 | 1 | 3 |
| COMPARATIVE EXAMPLE 13 | 4.5 wt. % of PE2, 0.5 wt. % PE1 | 1 | 5 |
| COMPARATIVE EXAMPLE 14 | 0.25 wt. % of PE3, 0.25 wt. % PE4 | 1 | 3 |

All patents and publications referred to herein are hereby incorporated by reference in their entirety. Various modifications and alterations of this disclosure may be made by those skilled in the art without departing from the scope and spirit of this disclosure, and it should be understood that this disclosure is not to be unduly limited to the illustrative embodiments set forth herein.

What is claimed is:

1. A fluorinated composition comprising:
(a) from 51 to 95 parts by weight of a first polyfluoropolyether silane represented by the formula:

$$R_{fa}O(CF(CF_3)CF_2O)_pCF(CF_3)CH_2OZ^1Si(Y^1)_3$$

wherein:
$Z^1$ represents —$R^1$—S—$R^2$—, —$R^1$—S(=O)—$R^2$—, or —$R^1$—S(=O)$_2$—$R^2$—, wherein $R^1$ and $R^2$ independently represent alkylene groups having from 1 to 12 carbon atoms;
each $Y^1$ independently represents a hydrolyzable group; and
$R_{fa}$ represents a perfluoroalkyl group having from 1 to 12 carbon atoms, optionally substituted with at least one catenated oxygen atom or —$NR^8$—group, wherein $R^8$ represents a perfluoroalkyl group;

(b) from 5 to 49 parts by weight of a second polyfluoropolyether silane represented by formula:

$$R_{fb}[R^5CH_2OZ^2Si(Y^2)_3]_2$$

wherein:
each $Z^2$ independently represents —$R^3$—S—$R^4$—, —$R^3$—S(=O)—$R^4$—, or —$R^3$S(=O)$_2$—$R^4$—, wherein $R^3$ and $R^4$ independently represent alkylene groups having from 1 to 12 carbon atoms;
each $Y^2$ independently represents a hydrolyzable group;
each $R^5$ independently represents a covalent bond, or —$(OR^7)_b$—, wherein each $R^7$ independently represents a branched perfluoroalkylene group, and each b independently represents a number greater than or equal to one; and
$R_{fb}$ represents a perfluoroalkylene group having at least 3 carbon atoms, optionally substituted with at least one catenated oxygen atom or —$NR^6$—group, wherein $R^6$ represents a perfluoroalkyl group,
wherein the parts by weight of the first polyfluoropolyether silane and the second polyfluoropolyether silane are based on the total parts of the first polyfluoropolyether silane and the second polyfluoropolyether silane combined.

2. The fluorinated composition of claim 1, wherein the second polyfluoropolyether silane is represented by the formula:

$$(Y^2)_3SiZ^2OCH_2CF_2R^9CF_2CH_2OZ^2Si(Y^2)_3$$

wherein $R^9$ is a divalent group consisting of from 1 to 50 —$OCF_2$—groups randomly interspersed with from 3 to 40 —$OCF_2$—groups.

3. The fluorinated composition of claim 1, wherein $Z^1$ is a divalent group represented by the formula:

—$R^1SR^2$— and wherein each of $R^1$ and $R^2$ independently represents an alkylene group having from 1 to 12 carbon atoms.

4. The fluorinated composition of claim 1, wherein $Z^1$ is —$CH_2CH_2CH_2SCH_2CH_2CH_2$—.

5. The fluorinated composition of claim 1, wherein $Z^2$ is a divalent group represented by the formula:

—$R^3SR^2$— and wherein each of $R^3$ and $R^4$ independently represents an alkylene group having from 1 to 12 carbon atoms.

6. The fluorinated composition of claim 1, wherein $Z^2$ is —$CH_2CH_2CH_2SCH_2CH_2CH_2$—.

7. The fluorinated composition of claim 1, wherein the fluorinated composition comprises from 60 to 95 parts by weight of the first polyfluoropolyether silane based on a combined weight of the first and second polyfluoropolyether silanes.

8. The fluorinated composition of claim 1, wherein the fluorinated composition comprises from 65 to 75 parts by weight of the first polyfluoropolyether silane.

* * * * *

UNITED STATES PATENT AND TRADEMARK OFFICE
CERTIFICATE OF CORRECTION

| | | |
|---|---|---|
| PATENT NO. | : 8,664,323 B2 | Page 1 of 1 |
| APPLICATION NO. | : 13/111504 | |
| DATED | : March 4, 2014 | |
| INVENTOR(S) | : Suresh Iyer | |

It is certified that error appears in the above-identified patent and that said Letters Patent is hereby corrected as shown below:

In the Specification

<u>Column 8</u>
Line 8, Delete "sinks" and insert -- sinks. --, therefor.

In the Claims

<u>Column 15</u>
Line 57, Claim 1, after "group;" insert -- p is a number in a range of from 3 to 50; and --.

Signed and Sealed this
Seventh Day of October, 2014

Michelle K. Lee
*Deputy Director of the United States Patent and Trademark Office*